United States Patent [19]

Lange

[11] Patent Number: 4,564,556

[45] Date of Patent: Jan. 14, 1986

[54] TRANSPARENT NON-VITREOUS CERAMIC PARTICULATE

[75] Inventor: Roger W. Lange, St. Paul, Minn.

[73] Assignee: Minnesota Mining and Manufacturing Company, St. Paul, Minn.

[21] Appl. No.: 653,779

[22] Filed: Sep. 24, 1984

[51] Int. Cl.[4] .......................... B32B 5/16; B32B 9/00; C01B 33/16

[52] U.S. Cl. .................................. 428/325; 428/328; 428/329; 428/402; 428/404; 501/33

[58] Field of Search .................. 501/33; 428/328, 329, 428/402, 404, 325

[56] References Cited

U.S. PATENT DOCUMENTS

| | | | |
|---|---|---|---|
| 2,326,634 | 8/1943 | Gebhard et al. | 350/105 |
| 2,354,018 | 7/1944 | Heltzer et al. | 350/105 |
| 2,963,378 | 12/1960 | Palmquist et al. | 106/193 J |
| 3,026,177 | 3/1962 | St. Pierre et al. | 423/625 |
| 3,313,602 | 4/1967 | Smith et al. | 423/252 |
| 3,442,821 | 5/1969 | Hilfmann | 502/8 |
| 3,700,305 | 10/1972 | Bingham | 350/105 |
| 3,709,706 | 1/1973 | Sowman | 501/103 |
| 3,714,071 | 1/1973 | Michalko | 502/8 |
| 3,795,524 | 3/1974 | Sowman | 501/95 |
| 3,872,217 | 3/1975 | Merz et al. | 423/338 |
| 3,941,719 | 3/1976 | Yoldas | 502/355 |
| 4,025,159 | 5/1977 | McGrath | 350/105 |
| 4,117,192 | 9/1978 | Jorgensen | 428/337 |
| 4,148,864 | 4/1979 | Groth et al. | 423/335 |
| 4,166,147 | 8/1979 | Lange et al. | 428/328 |
| 4,248,932 | 2/1981 | Tung et al. | 428/325 |
| 4,255,286 | 3/1981 | Berek et al. | 252/448 |
| 4,314,827 | 2/1982 | Leitheiser et al. | 51/298 |
| 4,349,456 | 9/1982 | Sowman | 106/300 |
| 4,367,919 | 1/1983 | Tung et al. | 350/105 |

OTHER PUBLICATIONS

Haas, P. A., et al., "Preparation of Urania and Urania-- Zirconia Microspheres by a Sol Gel Process", *The Canadian Journal of Chemical Engineering*, pp. 348-353 (Dec., 1966).

Haas, P. A. and Clinton, S. D., "Preparation of Thoria and Mixed Oxide Microspheres", *I&EC Product Research and Development*, pp. 236-244 (Sep. 1966).

Sheppard, L. M., "Better Ceramics through Chemistry", *Materials Engineering*, Jun., 1984, pp. 45-52.

Haas, P. A., "Sol-Gel and Gel-Sphere Technology", *Oak Ridge National Laboratory Review*, pp. 45-51 (1984).

Matijevic, E., *Surface and Colloid Science*, vol. 6, (1973) pp. 77 and 78.

Haas, P. A., et al., "Preparation of Reactor Fuels by Sol-Gel Processes", *Chemical Engineering Progress Symposium Series*, vol. 63, No. 80 (1967) pp. 16-27.

*Primary Examiner*—William J. Van Balen
*Attorney, Agent, or Firm*—D. M. Sell; J. A. Smith; D. B. Little

[57] ABSTRACT

Solid, transparent, non-vitreous, ceramic particles useful as lens elements in retroreflective pavement markings characterized by having:

A. at least one metal oxide phase; and

B. an average minimum dimension of more than 125 micrometers.

These particles are formed by various sol gel techniques, one example of which is the chemical gelation of titania sols by first mixing with glacial acetic acid, then with ammonium acetate, followed by formation of microspheres in 2-ethylhexanol. Microspheres of this ceramic composition can have relatively large diameters (e.g. over 200–1000 micrometers) making them quite useful as retroreflective lens elements in pavement marking sheet materials.

25 Claims, 1 Drawing Figure

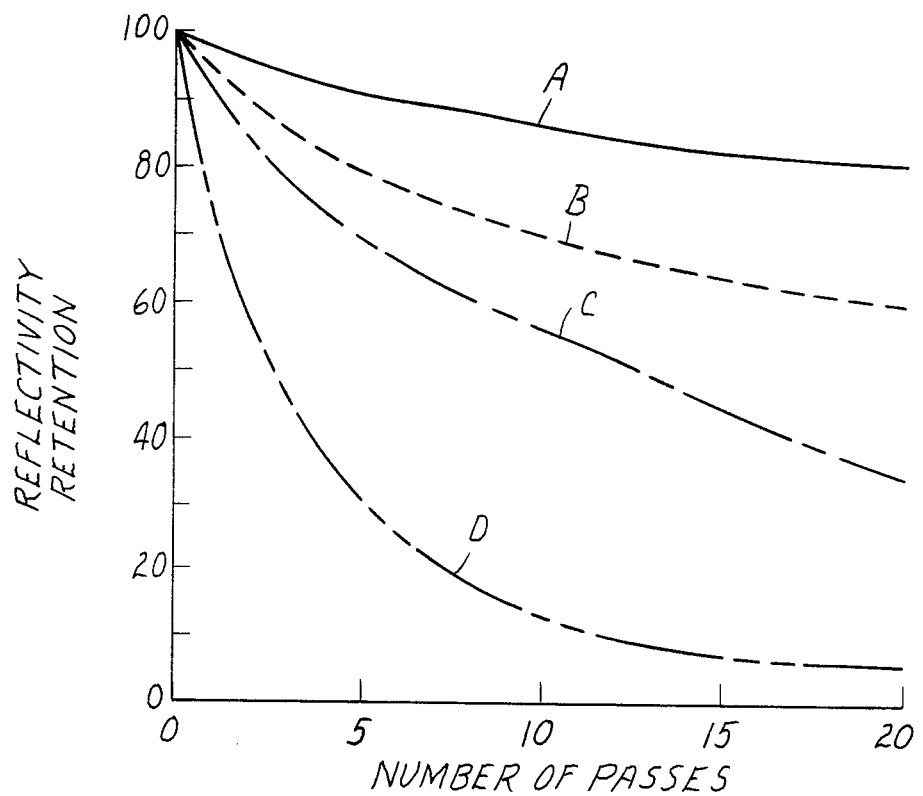

TRANSPARENT NON-VITREOUS CERAMIC PARTICULATE

TECHNICAL FIELD

This invention relates to ceramic particles such as microspheres made of such materials as zirconia-silica mixtures. It also relates to the field of pavement markings that include transparent microspheres for reflectorizing the markings. In another aspect it relates to a process for preparing such ceramic particles.

BACKGROUND

The pavement marking industry has long desired transparent microspheres that would be useful as brighter and more durable retroreflective elements in pavement markings. The transparent microspheres now most widely used for pavement markings are made of certain glasses, which are amorphous vitreous materials generally of the soda-lime-silicate type which, although having acceptable durability, have a refractice index of only about 1.5, which greatly limits their retroreflective brightness.

higher-index glass microspheres of improved durability have been taught in U.S. Pat. No. 4,367,919, but even a higher degree of durability has been desired.

A transparent microsphere is taught in U.S. Pat. No. 3,709,706. These microspheres are ceramic microspheres made by sol-gel processes from silica and zirconium compounds. Generally, a sol-gel process is one which converts a colloidal dispersion, sol, aquasol or hydrosol of a metal oxide (or precursor thereof) to a gel, which is a form of colloid which restrains the mobility of the components. The gelling step is often followed by drying and then firing to obtain a ceramic material.

Although the ceramic microspheres taught in U.S. Pat. No. 3,709,706 have good durability, they have diameters smaller than desirable in certain pavement marking applications. Microspheres used in pavement markings generally average between about 150 and 1000 micrometers in diameter, in order to assure that the light-gathering portion of the microsphere protruding from the pavement marking is not obscured by road dirt. The prior art does not teach how to make ceramic microspheres which are both transparent and large enough for these pavement marking applications.

In addition to being rather large and transparent, in order to function in pavement markings, such microspheres need to be resistant to scratching, chipping, cracking, and fracture under the conditions to which they are subjected on the road.

DISCLOSURE OF INVENTION

The present invention provides new large transparent, solid ceramic particles, beads or microspheres which can be made with sufficient clarity, index of refraction, and other properties to make them useful as superior lens elements in retroreflective pavement markings. The new ceramic microspheres offer a combination of retroreflective brightness and durability that, insofar as is known, has not before been available in a pavement marking lens element. These new particles may be summarized as:

solid, transparent, non-vitreous, ceramic microspheres useful as lens elements in retroreflective pavement markings having at least one metal oxide phase, and an average particle size (minimum particle dimension) of more than 125 micrometers.

The term solid means a solid which is not hollow, i.e. lacking any substantial cavities within the microspheres such as described in U.S. Pat. No. 4,349,456 on ceramic metal oxide microcapsules.

The term non-vitreous, for purposes of this description, means that the ceramic has not been derived from a melt or mixture of raw materials brought to the liquid state at high temperature. This term is used for the purpose of distinguishing the inventive ceramic microspheres over glass beads which are made by a melt process.

The term transparent, of purposes of this discussion means that the ceramic microspheres when viewed under an optical microscope (e.g., at 100X) have the property of transmitting rays of visible light so that bodies beneath the microspheres, such as bodies of the same nature as the microspheres can be clearly seen through the microspheres, when both are immersed in oil of approximately the same refractive index as the microspheres. Although the oil should have a refractive index approximating that of the microspheres, it should not be so close that the microspheres seem to disappear (as they would in the case of a perfect index match). The outline, periphery or edges of bodies beneath the microspheres are clearly discernible.

The inventive microspheres can be made fully dense. The term fully dense means close to theoretical density and having substantially no open porosity detectable by standard analytical techniques such as the B.E.T. nitrogen technique (based upon adsorption of $N_2$ molecules from a gas with which a specimen is contacted). Such measurements yield data on the surface area per unit weight of a sample (e.g. $m^2/g$) which can be compared to the surface area per unit weight for a mass of perfect microspheres of the same size to detect open porosity. Higher specific surface ($m^2/g$) indicates higher surface irregularities and/or porosity. Such measurements may be made on a Quantasorb apparatus made by Quantachrome Corporation of Syosset, N.Y. Density measurements may be made using an air or water pycnometer.

The microspheres described herein may be truly spherical but may also be oblate or prolate.

The preferred ceramic microspheres are also generally characterized by: an average hardness greater than sand, which is an abrasive material often found on roads; toughness, crush resistance, sphericity and retroreflectivity as great or greater than those of conventional glass beads having a similar size and a refractive index of about 1.5; and an index of refraction of between about 1.4 and 2.6. The inventive microspheres also have fewer internal imperfections and inclusions than conventional glass beads of a similar size.

The present invention also provides sol-gel processes for making the inventive ceramic microspheres. One improved sol-gel process is a chemical gelation process (as distinguished from a dehydrative gelatin process) in which gelation of a sol is induced by chemical disruption of the stability of the sol. For colloidal metal oxides in aqueous sols, such as zirconia and silica, this often entails adjusting the pH to an unstable regime by the addition of a gelling agent. Prior to gelation, which may take from a few seconds to several minutes, the composition can be added to a particle forming fluid under agitation to form spheres. The size of the spheres can be controlled by the degree of agitation. The resulting solid, gelled microspheres are then recovered, dried and fired in an air atmosphere to convert them into the aforesaid ceramic microspheres.

Surprisingly, these techniques provide uncracked ceramic particles in large size (greater than 125 micrometers) with the previously mentioned combination of retroreflective brightness and durability not available from known glass microspheres. The sol-gel process also has the advantage of lower processing temperature than glass forming processes and thus less energy consumption per unit weight produced.

The ceramic microspheres of this invention are useful not only in pavement marking materials but also in other fields such as: peening materials (because of their toughness); high temperature ball bearings; fillers and reinforcing agents in such materials as glass, refractory materials, ceramics, metal matrix materials and polymers; reflective sheeting and media for attrition mills such as sand mills. The inventive ceramic microspheres can be crushed or otherwise pulverized and the particulate product used as an abrasive. After being thus reduced in size, the particles are no longer spherical but would have irregular shapes.

BRIEF DESCRIPTION OF THE DRAWING

The FIGURE is a graph of Reflectivity Retention vs. Number of Passes of a sand blast wear test for various pavement marking sheet materials. Curves A-D represent data on the performance of pavement marking sheet materials similar in all respects except for the following differences in the 300–500 micrometer diameter retroreflective lens elements used: Curve A is representative of data for zirconia-silica microspheres of this invention; curve B—1.5 index of refraction glass beads; curve C—1.75 refractive index glass beads; and curve D—1.9 refractive index glass beads.

DETAILED DESCRIPTION

The following list exemplifies the metals which form oxides useful in making the ceramic microspheres of this invention: aluminum, silicon, thorium, tin, titanium, yttrium, zirconium and mixtures of these oxides with each other and with other additives. The formulas for these oxides are exemplified by: $Al_2O_3$, $SiO_2$, $ThO_2$, $SnO_2$, $TiO_2$, $Y_2O_3$ and $ZrO_2$. Of these, the oxides of zirconium, silicon and titanium are preferred.

The following list exemplifies other metals whose oxides can serve as useful materials in admixture with the above mentioned oxides: antimony, barium, beryllium, bismuth, boron, calcium, lead, magnesium, strontium, tantalum, zinc, and mixtures of the foregoing. These oxides are for the most part colorless or only weakly colored and are exemplified by BaO, BeO, $Bi_2O_3$, $B_2O_3$, CaO, PbO, $Sb_2O_5$, SrO, $Ta_2O_5$, MgO, and ZnO.

All of these metal oxides can be furnished in the form of aqueous sols or solutions of metal oxide precursors that are stable in a normal air environment, e.g., 23° C. and 50% relative humidity. More information on such metal oxides appears in U.S. Pat. No. 4,349,456 Column 3, line 32—Column 4, line 5 which is hereby incorporated by reference herein.

The inventive ceramic articles which are made with a silica sol have an amorphous silica phase. Most other metal oxides form a polycrystalline or microcrystalline phase. There are many useful combinations of a polycrystalline metal oxide phase with an amorphous phase such as silica.

A study of the effect of silica on zirconia-silica microspheres has indicated that clarity is increased with decreasing silica colloid particle size. The size of the colloidal silica particles in the starting material can vary, for example from 0.001 to 0.1 micrometers in largest dimension. A silica colloid particle size of less than about 200 angstroms (0.020 micrometers) is believed to yield ceramic microspheres having better transparency.

Whereas prior-art glass microspheres used as retroreflective elements have a generally uniform, continuous, glassy structure, substantially free of crystallinity (often specified to have less than 5 percent crystallinity), microspheres of the invention preferably have a subdivided or grainy structural nature, comprising a multiplicity of grains such as amorphous remnants of colloidal particles from a sol used in preparing the microspheres of the invention, or crystallites. The amorphous grains may be joined to one another (e.g., through covalent bonding), as in an amorphous silica microsphere of the invention or, they may be joined to themselves and/or crystallites, as in microspheres in which there is an amorphous matrix having crystallites dispersed throughout. Also, the crystallite grains may be joined to one another, as in microspheres comprising crystallites, or they may be joined to themselves and/or amorphous grains, as in microspheres in which crystallites are dispersed in an amorphous matrix.

The grainy nature of microspheres of the invention is desired because it makes the microspheres more tough and resistant to fracture. In contrast to the straight line fractures that can occur in a continuous glassy structure, fracture in a microsphere of the invention typically proceeds in a tortuous path along the boundaries between the grains, which requires greater energy. An important advantage of microspheres of the invention is their superior toughness.

The term grain will be used hereinafter as a term generic to crystallites in crystalline materials and to domains or colloidal particles in amorphous materials. For best reflective brightness, it is preferred that the size of grains in the microspheres be no larger than 1000 angstroms (crystallites preferably 50–400 angstroms) to minimize the effect of grain boundaries on light transmittance and also to minimize the effect of larger areas on light scattering especially with large differences in refractive index between different phases (e.g. $ZrO_2$ and $SiO_2$). In order to minimize light scattering, crystallites of a light transmissive material preferably have a size less than one quarter of the transmitted light. 1000 Angstroms is well below one quarter of the average wavelength of visible light which is about 5500 angstroms. By using microspheres with the grain size specified above, one obtains the toughness and transparency which has long been desired in a large bead.

Voids in microspheres of the invention are desirably avoided, i.e., by firing the gelled precursors to a dense state, to improve transparency, to avoid the weakening effect that structural gaps can cause, and to avoid absorption of moisture or other liquids that can degrade the microspheres, e.g., through freeze-thaw cycles. In the present invention, large particles have been fired to a dense state while avoiding undesired crystal growth that would take away needed transparency.

From X-ray analyses of zirconia-silica microspheres of the invention, it appears that the zirconia initially crystallizes in a predominantly pseudo-cubic form which then converts to tetragonal zirconia between about 910° and 1000° C. The microspheres become slightly more crystalline between 1000° and 1100° C., and it is within this temperature range, when the zirconia is mainly in the tetragonal form, that optimum hardness is achieved. As the microspheres are fired to higher temperatures (above 1100° C.) the cooled samples are found to contain increasing amounts of the monoclinic modification, and these microspheres display a loss of clarity and hardness. Also, crystallite size increases with higher temperature and longer firing times.

In some of the zirconia-silica microspheres, there has been found a relatively thin (e.g. about 10 micrometers thick on a 200 micrometer diameter microsphere) continuous uniform zirconia rich layer at the surface of the microsphere. Zirconia content at the surface has been found to be up to about 40 mole percent higher than its proportion in the center region, and silica content has been found substantially lower in the exterior region than the average silica content for the entire bead.

Silica-containing compositions of this invention can be formed from a two phase system comprising an aqueous colloidal dispersion of silica (i.e., a sol or aquasol) and an oxygen containing metal compound which can be calcined to the metal oxide. The colloidal silica is typically in a concentration of about 1 to 50 weight percent in the silica sol. A number of colloidal silica sols are available commercially having different colloid sizes, see *Surface & Colloid Science,* Vol. 6, ed. Matijevic, E., Wiley Interscience, 1973. Preferred silicas are those which are supplied as a dispersion of amorphous silica in an aqueous medium (such as the Nalcoag Colloidal silicas made by Nalco Chemical Company) and those which are low in soda concentration and can be acidified by admixture with a suitable acid (e.g. Ludox LS colloidal silica made by E. I. DuPont de Nemours & Co.).

The zirconium compounds useful in making zirconia-silica sol gel ceramics can be organic or inorganic acid water-soluble salts, such as the zirconium salts of aliphatic or acyclic mono or di-carboxylic acids (e.g. formic, acetic, oxalic, citric, tartaric, and lactic acids). Zirconyl acetate compounds are particularly useful. For the chemical gelation process, acid deficient inorganic salts of zirconium are useful (e.g. nitrate, chloride, chlorate or sulfate salts). Colloidal zirconia sols are commercially available, for example nitrate stabilized (0.83 moles nitrate per mole of zirconia marketed by Nyacol, Inc. of Ashland, Mass.). Useful inorganic zirconium compounds are zirconium sulfate and zirconium oxychloride. See U.S. Pat. No. 3,709,706 Column 4 line 61—Column 5 line 5 for further details on zirconia sources.

The other metal oxides mentioned earlier (e.g. $Al_2O_3$ or MgO) can be supplied as water soluble salts such as nitrates, sulfates, halides, oxyhalides, phosphates, borates, carbonates, or salts of organic acids (mono- or di-carboxylic acids, oxoacids, hydroxy acids, amino acids or mixtures thereof).

In the case of zirconia-silica ceramics, the two major raw materials are usually present in amounts sufficient to provide equivalent $ZrO_2/SiO_2$ mole ratio in an aqueous dispersion in the range of about 10:1 to 1:10, preferable 5:1 to 1:5. As the proportion of the material having the higher index of refraction ($ZrO_2$) is increased, the refractive index of the resulting microspheres increases, thus allowing an adjustment of refractive index to suit different purposes. The refractive index difference between the two phases may impart a slight translucency.

The dispersion can be prepared by admixing a silica aquasol with an aqueous metal oxide solution under agitation. For some starting materials, reverse order of addition (i.e. adding the metal oxide solution to the silica aquasol under agitation) can lead to non-uniform interspersal of the amorphous and crystalline grains in the final microsphere. The mixture is agitated in order to obtain a uniform dispersion without forming a floc or precipitate and may be filtered to remove extraneous material. The aqueous mixture of colloidal silica suspension and zirconium compound will generally be relatively dilute (e.g. 15 to 30 weight percent solids).

Gelling may be by a number of techniques, some of which are described hereinafter. After the microspheres have been gelled and formed, they are collected (e.g. by filtration) and fired or exposed to high temperatures in an oxidizing (e.g. air) atmosphere. Firing may be done at temperatures ranging between 500° and 1200° C. It is preferred that, in the case of zirconia ceramics, most of the zirconia component be in the tetragonal form and thus higher temperatures (950°–1100° C.) are preferred. In the case ot titania, temperatures no higher than about 650° C. are preferred. Above that temperature some of the titania may convert to the rutile crystal form which results in translucency. The lower temperatures yield the anatase form. The addition of other metal oxides to the titania may alter the preferred firing temperature which can be determined experimentally. In general, higher firing temperatures also help to achieve microspheres which are fully dense. In the firing process, the unfired ceramic microspheres should be loosely packed in order to obtain a uniform, free flowing fired product.

One variation of the sol gel process which has been successfully used to make large transparent ceramic microspheres of this invention is chemical gelation, one method of which comprises adding to a metal oxide sol a gelling agent which alters the pH of the sol and induces gelation by a variety of chemical mechanisms. One variant of this method uses a colloidal zirconia preferably stabilized with an inorganic anion or an acid deficient zirconium salt (preferably inorganic) as the zirconia source and a silica sol as a silica source. These may be mixed and concentrated to obtain a mixed system of the desired viscosity. The sol mixture can be induced to gel by raising its pH, for example by adding ammonium acetate.

The chemical gelation process enables the formation of a mass of discrete, solid, transparent, non-vitreous, fully dense ceramic microspheres, having an average diameter of more than 200 micrometers. The term formed mass means a mass of microspheres yielded by one batch of the manufacturing process or a random sample taken from a continuous manufacturing process which process (in either case, batch or continuous) does not include a size classification step to eliminate a major portion of the formed microspheres. When made with a zirconia source, these microspheres are filled with zirconia crystallites, no larger than 1000 angstroms in size, as a polycrystalline phase comingled throughout the spheres with the amorphous silica phase.

To be successfully applied to the preparation of ceramic beads, a chemical gelation technique should use a gelling agent which: (1) can be thoroughly mixed with the sol system without producing localized gelation; (2) gives sufficient working time to allow for the formation of spheres prior to the onset of gelation; and (3) leaves no appreciable residue upon combustion which might opacify or degrade the microspheres. The quantity of gelling agent to be used is found empirically, one method being to add gelling agent to the sol in small incremental amounts until gelation occurs within the desired time.

There is no universal particle forming fluid, but most are substantially water immiscible. Some usable particle forming fluids are: hydrocarbons such as hexane and toluene, dichloroethane, carbon tetrachloride, 2-ethylhexanol, n-butanol, and trichloroethane. Oils are also useful in this process. The appropriate forming fluid for a particular sol-gel system is found by experimentation. Generally, it is preferred that the volume of sol be 1 to 10 percent of the volume of forming fluid used.

Ammonium acetate solutions have been successfully used in a chemical gelation process for controllably gelling titania sols yielding titania ceramic microspheres greater than 200 micrometers in diameter. The addition of small controlled amounts of glacial acetic acid to titania sols prior to the addition of ammonium acetate produces a material which can be readily and controllably gelled with a high degree of homogeneity. The quantity of acetic acid is roughly on a 1:1 mole ratio to the chloride ion present in the titania sol (see next paragraph for titania sol formation). This, in turn, has resulted in the ability to generate large reflective spherical particles.

The manufacture of titania sols and gels is described in U.S. Pat. No. 4,166,147 at column 2, line 54-column 4, line 15 and other passages within that patent. By way of example, a titania sol may be made by adding 5 parts tetraisopropyl titanate slowly to one part of 37% concentrated hydrochloric acid cooled in a water bath. Water and other volatiles are removed at ambient temperature (20°-35° C.) using evacuation (water aspirator) or evaporation to form a gel which contains about 58 to 65 weight percent $TiO_2$, 12 to 20 weight percent HCl, 10 to 30 weight percent $H_2O$ and a small amount of organic material. This gel is redispersed in water to form a clear sol using about four parts water to one part gel.

The hardness of the particles of this invention is typically above 400 Knoop, preferably greater than 500 knoop. Knoop hardness (50 and 100 g. loads) measurements have been made of the inventive ceramic microspheres and certain controls. Representative hardness measurements are given in Table 1 below:

TABLE 1

| Sample Number | Main Constituents | Firing Temperature | Knoop Hardness Range | Knoop Hardness Average |
|---|---|---|---|---|
| 1 | $ZrO_2$—$SiO_2$ | 1100° C. | 703–863 | 797 |
| 2 | $ZrO_2$—$SiO_2$ | 1000° C. | *834–1005 | 894 |
| 3 | $SiO_2$ | 1000° C. | 685–792 | 726 |
| Control Samples | | | | |
| 1.5 $N_D$ glass beads** | | | | 770 |
| 1.75 $N_D$ glass beads** | | | | 602 |
| 1.9 $N_D$ glass beads** | | | | 566 |
| road sand | | | 141–955 | 573 |
| sand blast sand | | | | 1,117 |

*50 g. indenter load
**150–210 micrometer particle size
$N_D$ is refractive index.

Crush resistance of the inventive microspheres has also been measured on an apparatus the major feature of which is two parallel plates made of very hard, non-deforming material (.e.g, sapphire or tungsten carbide). A single microsphere of known diameter is placed on the lower plate and the upper plate lowered until the microsphere fails. Crush resistance is the force exerted on the microsphere at failure divided by the cross-sectional area of the microspheres ($\pi r^2$). Ten microspheres of a given composition are tested and the average result is reported as the crush resistance for the composition. Crush resistance of the inventive microspheres has been measured at about 175,000 to 230,000 psi (1200–1600 megaPascals). Glasses typically have a crush resistance of about 50,000 to 75,000 psi (350–525 megaPascals).

The invention will be further clarified by a consideration of the following examples which are intended to be purely exemplary.

EXAMPLE I 30 g. of titania gel was mixed in 60 g. of water. Three grams of carbon black were added to remove organic impurities and the mixture was filtered through a 1.5 micrometer Millipore ®filter. To 20g of the above sol was added 3 g. of glacial acetic acid, followed by 4.6 g. of a solution consisting of one part by weight ammonium acetate dissolved in two parts by weight of water. The resulting mixture was then added immediately to 300 g. of 2-ethylhexanol under agitation (3-blade propellor mixer at about 300 rpm) in a 500 ml. beaker. The resulting mixture was stirred for 30 minutes and filtered to separate the gel particles from the alcohol. Transparent, hard spheres were recovered and observed to be up to about 1 mm. in diameter. These particles were dried at room temperature and at 90° C. After heating to 500° C., the particles were observed to be very clear to somewhat transluscent, depending on size and were up to 500 micrometers in diameter.

A portion of the microspheres made in this example was heated to 550° C. for fifteen minutes and cooled. When placed in a shallow aluminum pan and covered with water, these particles were observed to shine brightly when viewed with a flashlight beam from a side angle. A second sample of these microspheres were mounted on a white vinyl tape surface, and when this surface was coated with water, the particles were observed to shine brightly when viewed with a flashlight beam from a wide range of viewing angles. Another sample heated to 625° C. for 30 minutes was found to have a hardness of B 536 to 840 Knoop (650 average). Surface area measurements showed the sample to be close to fully dense.

EXAMPLE II

A nitrate stabilized zirconium oxide sol containing about 20% $ZrO_2$ by weight and about 0.83 M $NO_3$ per mole $ZrO_2$ (obtained from Nyacol Products Company) was ion exchanged with an anion exchange resin (Amberlyst A-21 resin made by Rohm and Haas Company) at a ratio of about 15 g. of resin to 100 g. of the sol. One gram of the ion exchanged zirconia sol was added to 20 g. of a filtered $TiO_2$ gel-water mixture prepared as in Example I. The molar ratio of the two oxides was approximately 97 percent $TiO_2$ and 3 percent $ZrO_2$. Three grams of glacial acetic acid was added to the above sol mixture with agitation. Three grams of a 1:1 (weight ratio) solution of ammonium acetate in water was then added with agitation. The above mixture was poured into a one liter beaker containing 900 ml. of 2-ethylhexanol saturated with water and under agitation. After stirring for five minutes, the mixture was filtered to separate the gelled particles from the alcohol. The recovered hard gelled spheres were clear, of excellent quality and had diameters ranging up to and over 1000 micrometers.

A sample of the gelled microspheres was placed in a Pyrex dish and placed in a box furnace, and the temperature was raised from room temperature to 400° C. over two hours. The 400° C. temperature was maintained for 30 minutes after which the dish was removed and cooled. The fired beads were very clear. A sample of the spheres was then placed in a crucible and heated to 620° C. in a box furnace. After 20 minutes at 620° C., the crucible was removed and cooled. Examination of the particles under the microscope at 80X magnification showed that they were transparent with a large proportion between 200 and 350 micrometers in diameter.

EXAMPLE III

Approximately 0.6 g. of a silica sol (having about 31 weight percent solids, about 150 Angstrom primary particle size, pH of about 8.2, $Na_2O$ content of about 0.10 percent and obtained as Ludox LS from E. I. DuPont de Nemours & Co.) was added to 20 g. of a titania sol prepared as in Example I. This mixture was about 97 mole percent $TiO_2$ and 3 mole percent $SiO_2$. After addition of glacial acetic acid and ammonium acetate, as in Example II, gel particles were formed. The hard gelled spheres which were recovered were very clear and up to and over 1000 micrometers in diameter. A sample was fired as in Example II and appeared less transparent than the zirconia titania particles but still had retroreflectivity in a flashlight beam. The overall particle size was larger than those of Example II.

EXAMPLE IV

A stable, ion-exchanged zirconia sol was prepared by mixing a nitrate stabilized zirconia sol (as used in Example II) with an ion exchange resin (as described in Example II) in a ratio of about 100 g of sol to 15 g resin. To about 21 g of the resulting stable zirconia sol were added about seven grams of silica sol (Ludox LS), and then about 2.5 g of a 50% aqueous ammonium acetate solution were added to the sol with agitation. The resulting mixture (having a $ZrO_2$:$SiO_2$ mole ratio of about 1:1) was immediately added to 500 ml of 2-ethylhexanol under agitation in a 600 ml beaker. After stirring for about 5 minutes, the mixture was filtered to separate the gel particles from the alcohol. Very transparent, rigid gelled spheres up to and exceeding 1 mm in diameter were recovered. These particles were dried and subsequently fired to 1000° C. Intact, transparent to slightly translucent spheres up to and over 500 micrometers in diameter were obtained. A micro-hardness test performed on the microspheres which had been fired at 1000° C. measured about 834 to 1005 knoop. Their surface area was measured and found to be about 0.015 $m^2/g$, indicating that they were essentially fully dense. A sample of the microspheres from this example was mounted on an adhesive-coated white vinyl strip. When observed in a flashlight beam, the particles reflected brilliantly from a wide range of viewing angles. Other mixtures of zirconia sols and silica sols were made as in this example to yield microspheres with indices of refraction up to 1.91.

EXAMPLE V 625 ml (510 g) of water saturated 2-ethyl hexanol was added to an 800 ml. beaker and was stirred with a three-blade propellor mixer at about 1000 rpm. 2.5 g. of a nonionic wetting agent (Tergitol ® TMN) was added.

In a second beaker, 4 grams of a solution comprising one part by weight ammonium acetate in two parts by weight water were added to 50 g. of an agitated silica sol obtained as Nalco 41D01 from Nalco Chemical Company. The contents of the second beaker was poured into the agitated 2-ethyl hexanol, and agitation was continued for about five minutes, during which gel particles formed. The gelled particles were removed by filtration. After drying at 90° C. a sample of the particles was placed in an electric furnace at 1000° C. and that temperature maintained for 30 minutes. Upon cooling, the particles were examined under a microscope. They were very clear and ranged in size from about 60 to 1000 micrometers in diameter. A few of the particles had crystallized and become opaque. The transparent microspheres produced were measured at an average hardness of 726 knoop and were observed to reflect light brightly in a flashlight beam. Surface area measurements of these particles showed them to be substantially fully dense.

It is within the scope of this invention to impart color to the transparent ceramic microspheres. The aqueous dispersions which are used to form the ceramics of this invention can contain various other water-soluble metal compounds which will impart internal color to the finished ceramic without sacrificing clarity. The adding of colorants to the inventive ceramics may be done in accordance with the teaching of U.S. Pat. No. 3,795,524 found in Col. 4, line 72-Col. 5, line 27. Colorants such as ferric nitrate (for red or orange) may be added to the dispersion in an amount of about 1 to 5 weight percent of the total metal oxide present. Color can also be imparted by the interaction of two colorless compounds under certain processing conditions (e.g., $TiO_2$ and $ZrO_2$ may interact to produce a yellow color).

Industrial Applicability

The transparent, ceramic microspheres of this invention are quite useful in pavement marking sheet materials (i.e. sheeting to be applied to road surfaces). The microspheres of this invention can also be incorporated into coating compositions which generally comprise a film-forming material in which a multiplicity of the microspheres are dispersed (e.g., see Palmquist U.S. Pat. No. 2,963,378). The microspheres may also be used in drop-on applications for such purposes as highway lane striping in which the beads are simply dropped onto wet paint or hot thermoplastic and adhered thereto.

There are several types of retroreflective sheeting in which the inventive microspheres may be used, such as exposed lens (as taught for example in U.S. Pat. Nos. 2,326,634 and 2,354,018), embedded lens (see for example U.S. Pat. No. 2,407,680) and encapsulated lens (see U.S. Pat. No. 4,025,159) sheeting. These sheeting types and methods for manufacturing them are known to the art. The drawings of the aforementioned patents (U.S. Pat. Nos. 4,025,159; 2,407,680; and 2,326,634) illustrate the various sheeting types and are incorporated by reference herein.

One type of retroreflective sheet material useful for traffic signs comprises a polymeric binder film in which a monolayer of the inventive microspheres are embedded to about half their diameter or more. The microspheres are in optical connection with a reflecting means, such as an aluminum coating on their embedded surfaces. Such retroreflective sheet material can be made by : (i) partially embedding a monolayer of the inventive microspheres into a treated carrier web (e.g., polyethylene-coated paper); (ii) coating the microspheres with aluminum by vacuum vapor deposition; (iii) applying a binder coating (e.g., 68 weight percent solids alkyd resin solution in aromatic solvent); (iv) curing the binder (e.g., 30 minutes at 95° C.); (v) applying a clear polymeric base layer (e.g., 20 weight percent solution of polyvinyl butyral in xylene-butanol solvent) over the binder; (vi) drying the base layer (95° C. for 30 minutes); and (vii) stripping away the carrier web.

One typical pavement marking sheet is described in U.S. Pat. No. 4,248,932. This sheet material is a prefabricated strip adapted to be laid on and secured to pavement for such purposes as lane dividing lines and comprises:
1. A base sheet, such as a soft aluminum foil which is conformable to a roadway surface;
2. A top layer (also called the support film or binder film) adhered to one surface of the base sheet and being very flexible and resistant to rupture; and
3. A monolayer of particles such as transparent microsphere lens elements partially embedded in the top layer in a scattered or randomly separated manner.

The pavement marking sheet construction may also include an adhesive (e.g., pressure sensitive, heat or solvent activated, or contact adhesive) on the bottom of the base sheet.

The base sheet may be made of an elastomer such as acrylonitrile-butadiene polymer, polyurethane, or neoprene rubber.

The top layer in which the transparent microspheres are embedded may typically be a polymer such as vinyl polymers, polyurethanes, epoxies, and polyesters. The microsphere lenses may alternatively be completely embedded in a layer of the pavement marking sheet. Another patent describing such pavement marking sheet material is U.S. Pat. No. 4,117,192.

Pavement marking sheets may be made by processes known in the art (see e.g. U.S. Pat. No. 4,248,932), one example comprising the steps of: (i) coating onto a base sheet of soft aluminum (50 micrometers thick) a mixture of resins (e.g., epoxy and acrylonitrile butadiene elastomer mixture), pigment ($TiO_2$) and solvent (e.g., methylethylketone) to form the support film; (ii) dropping onto the wet surface of the support film ingredients a multiplicity of the sol gel microspheres (160 microns and larger in diameter) of this invention; and curing the support film at 150° C. for about 10 minutes. A layer of adhesive is then usually coated on the bottom of the base sheet.

The microspheres may be treated with an agent which improves adhesion between them and the top layer, or such an agent may be included in the top layer where it contacts the microspheres. Silane coupling agents are useful for this purpose.

Pigments or other coloring agents may be included in the top layer in an amount sufficient to color the sheet material for use as a traffic control marking. Titanium dioxide will typically be used for obtaining a white color; whereas, lead chromate will typically be used to provide a yellow color.

In some useful embodiments of the invention, a specular reflective means is provided by a layer of metal (e.g. aluminum) vapor-deposited on the microspheres. Another useful specular reflective means is a dielectric reflector which comprises one or more layers of a transparent material behind the microspheres, each layer having a refractive index of about 0.3 higher or lower than that of the adjacent layer or beads and each layer having an optical thickness corresponding to an odd numbered multiple of about ¼ wavelength of light in the visible range. More detail on such dielectric reflectors is found in U.S. Pat. No. 3,700,305.

Pavement marking sheet materials of this invention have been tested in a sand blast test. This test utilizes an apparatus comprised of a channel about 156 mm wide and 508 mm long in which is mounted a flat metal (e.g. aluminum) plate about 152 mm wide. The pavement marking sheet material sample being tested is adhered to the metal plate which is moved down the channel by engagement with an electric motor having a speed control. A commercial compressed air sand blast gun having a compressed air supply at 10 psig. (69 kPa) and using common sand blast sand (e.g., 70% 250/425 micrometer particle size) is directed toward a portion of the channel which must be passed by the sample. The sand blast gun is placed with its tip 762 mm from the point where sand will impact the sample, and it is oriented at about 75° to the channel such that the sample is moving toward the point where sand is impacting at a rate of about 0.04 m/sec (1½ in/sec.)

The sample passes the point of the impacting sand repeatedly, and reflectivity of the sample is measured after a number of passes to test the durability of the microsphere lenses. The figure represents sand blast data for pavement marking sheet materials similar in all respects except that there were different lens elements used in the four types of sheeting tested. The plotted curves present retained reflectivity data as indicated previously under Brief Description of the Drawings. The inventive sample retained substantially more of its original reflectivity than any of the glass bead samples.

The actual data from which retained reflectivity was calculated for the Figure is shown in Table 2 below. Reflective brightness or retroreflectivity is recorded in units of millicandela/foot candle/square foot (mcd/fc/ft²) as measured by a photometer. All measurements were made with incident light at an angle of 86.5° from normal to the sample surface and with a divergence, angle between the light source and the photocell, of 1.0°.

TABLE 2

| Microsphere Type | Retroreflectivity (mc/fc/ft²) | | | |
|---|---|---|---|---|
| | $ZrO_2/SiO_2$ Ceramic | Glass | | |
| | | 1.5 $N_D$ | 1.75 $N_D$ | 1.9 $N_D$ |
| No. of Sand Blast Passes | | | | |
| 0 | 1188 | 308 | 1303 | 1776 |
| 5 | 1073 | 242 | 833 | 535 |
| 10 | 1020 | 209 | 752 | 238 |
| 15 | 994 | 198 | 579 | 132 |
| 20 | 958 | 184 | 341 | 102 |

The inventive zirconia/silica sol gel ceramic tested had a mole ratio of $ZrO_2:SiO_2$ of about 1:1 and an index of refraction of about 1.76–1.77. The above table shows that, in addition to retaining more of its retroreflectivity, the pavement marking sheet made with the inventive microspheres had a higher absolute retroreflectivity after only five passes of the sand blaster than any of the control samples, and continued to have superior retroreflectivity after 20 passes.

Other embodiments of this invention will be apparent to those skilled in the art from a consideration of this specification or practice of the invention disclosed herein. Various omissions, modifications, and alterations of this invention may be made without departing from the true scope and spirit of this invention which is indicated by the following claims.

What is claimed is:

1. Solid, transparent, non-vitreous, dense, ceramic microspheres comprising at least one crystalline phase comprising at least one metal oxide other than titanium dioxide, although titanium dioxide may be present in minor amounts, and having an average particle size of more than 125 micrometers, said microspheres being useful as lens elements.

2. The solid, transparent ceramic microspheres of claim 1 which are further characterized by an average grain size no larger than 1000 angstroms.

3. The transparent, ceramic microspheres of claim 1 which are further characterized by an average hardness greater than 400 Knoop.

4. The transparent, non-vitreous, ceramic microspheres of claim 1 wherein the metal oxide is zirconia.

5. The ceramic microspheres of claim 1 wherein the metal oxide is mixed with another metal oxide.

6. The transparent, ceramic microspheres of claim 1 comprising at least one polycrystalline and at least one amorphous phase.

7. The transparent, ceramic microspheres of claim 6 in which the amorphous phase comprises silica.

8. The transparent, ceramic microspheres of claim 7 in which the polycrystalline phase comprises zirconia.

9. The transparent, ceramic microspheres of claim 8 wherein the zirconia is predominantly of the tetragonal crystal structure.

10. The transparent, ceramic microspheres of claim 8 wherein the molar ratio of zirconia to silica is in the range of 10:1 to 1:10.

11. A sheet material comprising polymeric binder film in which is embedded a multiplicity of the solid, transparent, ceramic microspheres of claim 1.

12. A pavement marking sheet material comprising:
   a. a base sheet adherable to a roadway surface; and
   b. the sheet material of claim 11 adhered to one surface of the base sheet.

13. A retroreflective sheet material comprising a polymeric binder film in which a monolayer of the microspheres of claim 1 are embedded and in which said microspheres are in optical connection with a reflecting means.

14. Grinding grit comprising the solid, non-vitreous, ceramic microspheres of claim 6 which have been reduced in size.

15. Solid, transparent, non-vitreous, ceramic microspheres comprising polycrystalline titanium dioxide and having an average particle size greater than 200 micrometers, said microspheres being useful as lens elements.

16. A formed mass of discrete, solid, dense, transparent, non-vitreous, ceramic microspheres averaging at least 125 micrometers in diameter and useful as lens elements in retroreflective pavement markings, said microspheres comprising an amorphous, grainy silica matrix filled with zirconia crystallites less than about 1000 angstroms in size.

17. Solid, transparent, non-vitreous, ceramic microspheres consisting essentially of silica, having an average particle size of more than 125 micrometers, and being fully dense, said microspheres being useful as lens elements.

18. A pavement marking containing solid, transparent, non-vitreous, dense ceramic microspheres averaging greater than 125 micrometers in diameter and which consist essentially of grains less than about 1000 angstroms in size.

19. A chemical gelation process for making solid, non-vitreous ceramic particles comprising the steps of:
   (i) mixing a sol comprising a source of a metal oxide selected from the group consisting of titania, silica, zirconia and mix;tures of the foregoing with a gelling agent comprising ammonium acetate;
   (ii) adding the composition from step (i) to a forming fluid in which particles form;
   (iii) separating the gel particles from the forming agent;
   (iv) drying the gel particles from step (iii);
   (v) firing the particles at temperatures between about 500° and 1200° C. in order to form fired, ceramic particles; and
   (vi) allowing the fired, transparent, ceramic particles from step (v) to cool.

20. The chemical gelation process of claim 19 wherein the metal oxide is titania and which further comprises mixing the titania sol with acetic acid before step (i).

21. The chemical gelation process of claim 19 which further comprises adding a colloidal silica sol to the sol of step (i).

22. The chemical gelation process of claim 21 wherein the silica sol has a colloid particle size of less than about 200 angstroms.

23. The chemical gelation process of claim 19 in which the metal oxide includes zirconia and the temperature of step (v) is between about 950° and 1100° C.

24. The chemical gelation process of claim 19 wherein the forming fluid of step (ii) is substantially water immiscible.

25. The solid, transparent, non-vitreous, ceramic microspheres of claim 15 wherein the titanium dioxide is mixed with another metal oxide.

* * * * *